March 20, 1951 — C. GERST — 2,546,063
TRANSMISSION
Filed May 19, 1948 — 5 Sheets-Sheet 1

INVENTOR.
CHRIS GERST
BY Gustav A. Wolff
ATT.

March 20, 1951 C. GERST 2,546,063
TRANSMISSION
Filed May 19, 1948 5 Sheets-Sheet 3

INVENTOR.
CHRIS GERST
BY
Gustav A. Wolff.
ATT.

March 20, 1951  C. GERST  2,546,063
TRANSMISSION
Filed May 19, 1948  5 Sheets-Sheet 4
Fig_5.
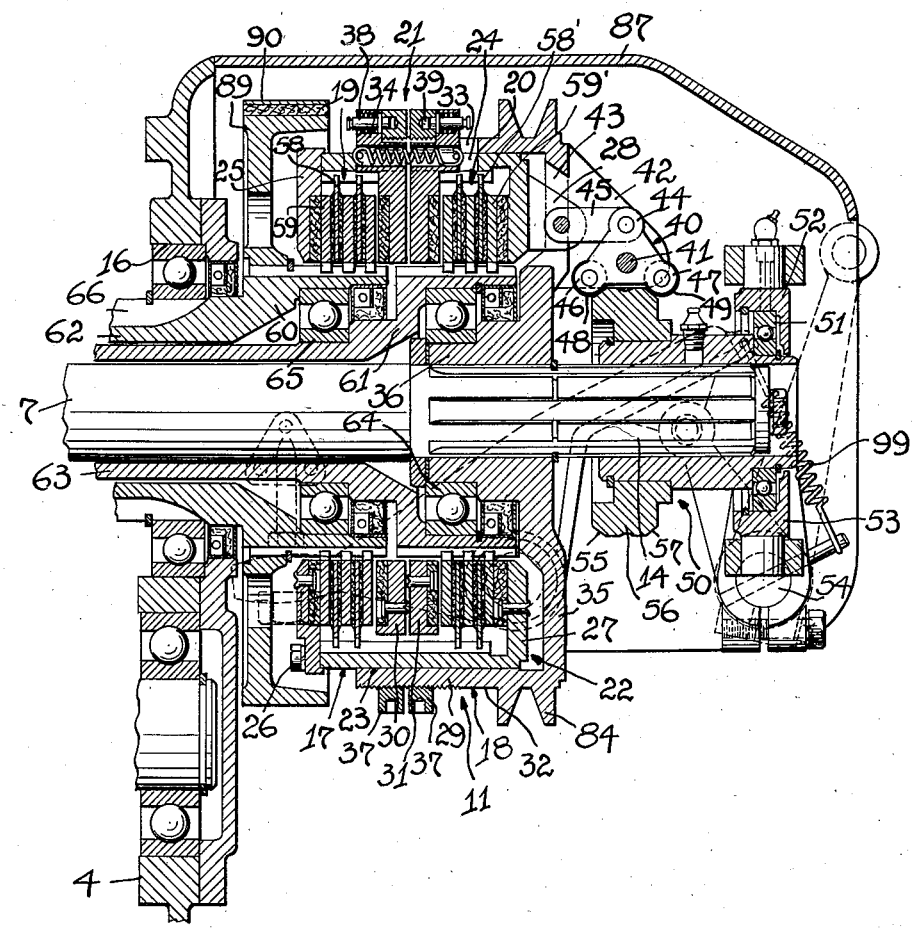
INVENTOR.
CHRIS GERST
BY
Gustav A. Wolff
ATT.

March 20, 1951     C. GERST     2,546,063
TRANSMISSION
Filed May 19, 1948     5 Sheets-Sheet 5
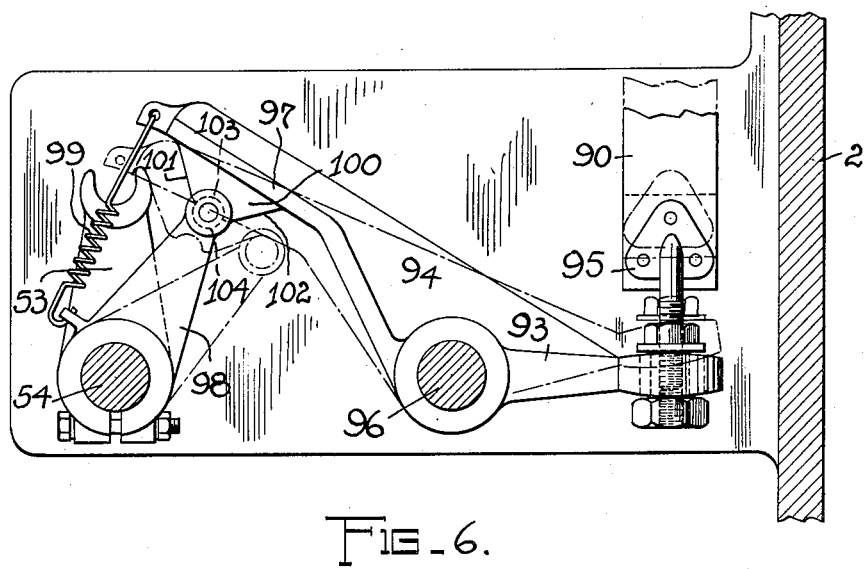
FIG_6.
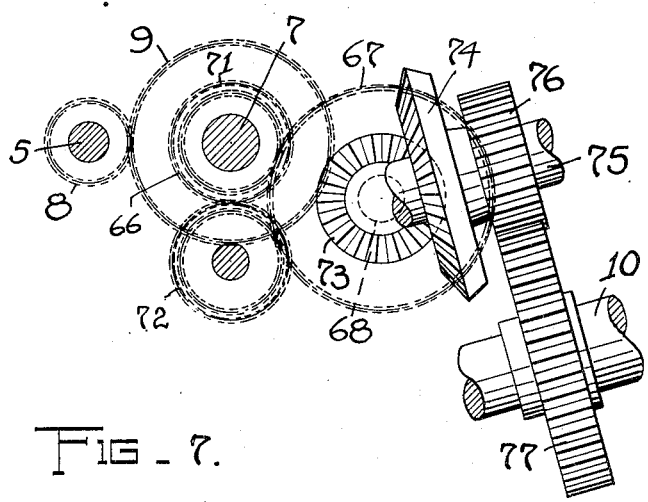
FIG_7.
INVENTOR.
CHRIS GERST
BY
ATT.

Patented Mar. 20, 1951

2,546,063

UNITED STATES PATENT OFFICE 2,546,063

TRANSMISSION

Chris Gerst, Detroit, Mich., assignor to The Transmission & Gear Company, Dearborn, Mich., a corporation of Michigan Application May 19, 1948, Serial No. 27,877

2 Claims. (Cl. 192—4)

This invention relates in general to transmissions and more particularly, to transmissions mounted on vehicles to transmit power from individual power units to rotary devices supported by the vehicles in axial alignment with their longitudinal axis.

The primary object of the present invention is the provision of a compact, readily reversible transmission having angularly related input and output shafts to permit transmission of power from a power unit to a rotary device laterally of the power unit and the transmission.

Another object of the invention is the provision of a readily reversible transmission having angularly related input and output shafts which are coupled with each other by gearing, intermediate shaft means and dual friction clutch means, the transmission meeting all requirements for high efficiency, smooth operation and convenience of control and repair.

Still further objects and novel features of construction, combination and relation of parts by which the objects in view have been attained, will appear and are set forth in detail in the course of the following specification. The drawings accompanying and forming part of the specification illustrate certain practical embodiments of the invention, but it will be apparent as the specification proceeds that the structure may be modified and changed in various ways without departure from the true spirit and broad scope of the invention.

In the drawings:

Fig. 5 is an enlarged, transversal sectional view through the dual clutch structure of the transmission;

Fig. 6 is an enlarged fragmentary sectional view on line 6—6 of Fig. 1; and

Fig. 7 is a diagrammatic view of the gearing of the transmission.

Figure 1:
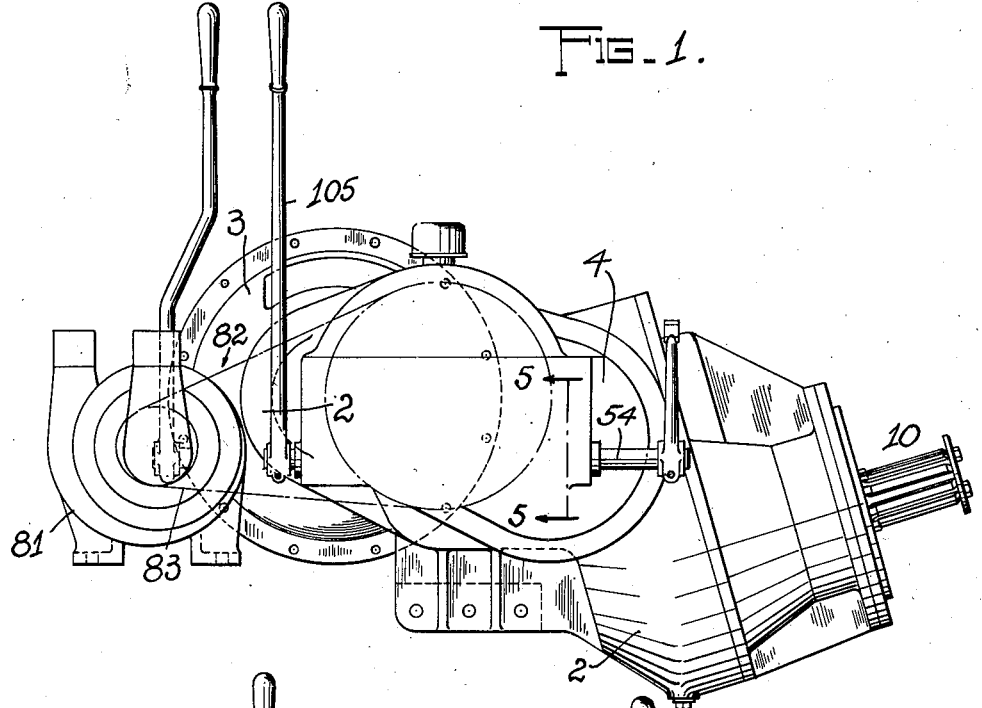
Fig. 1 is a front view of a power transmission built in accordance with the invention.
Figure 2:
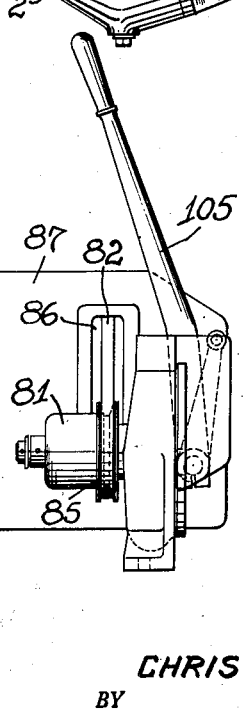
Fig. 2 is a side view of the transmission shown in Fig. 1.
Figure 3:
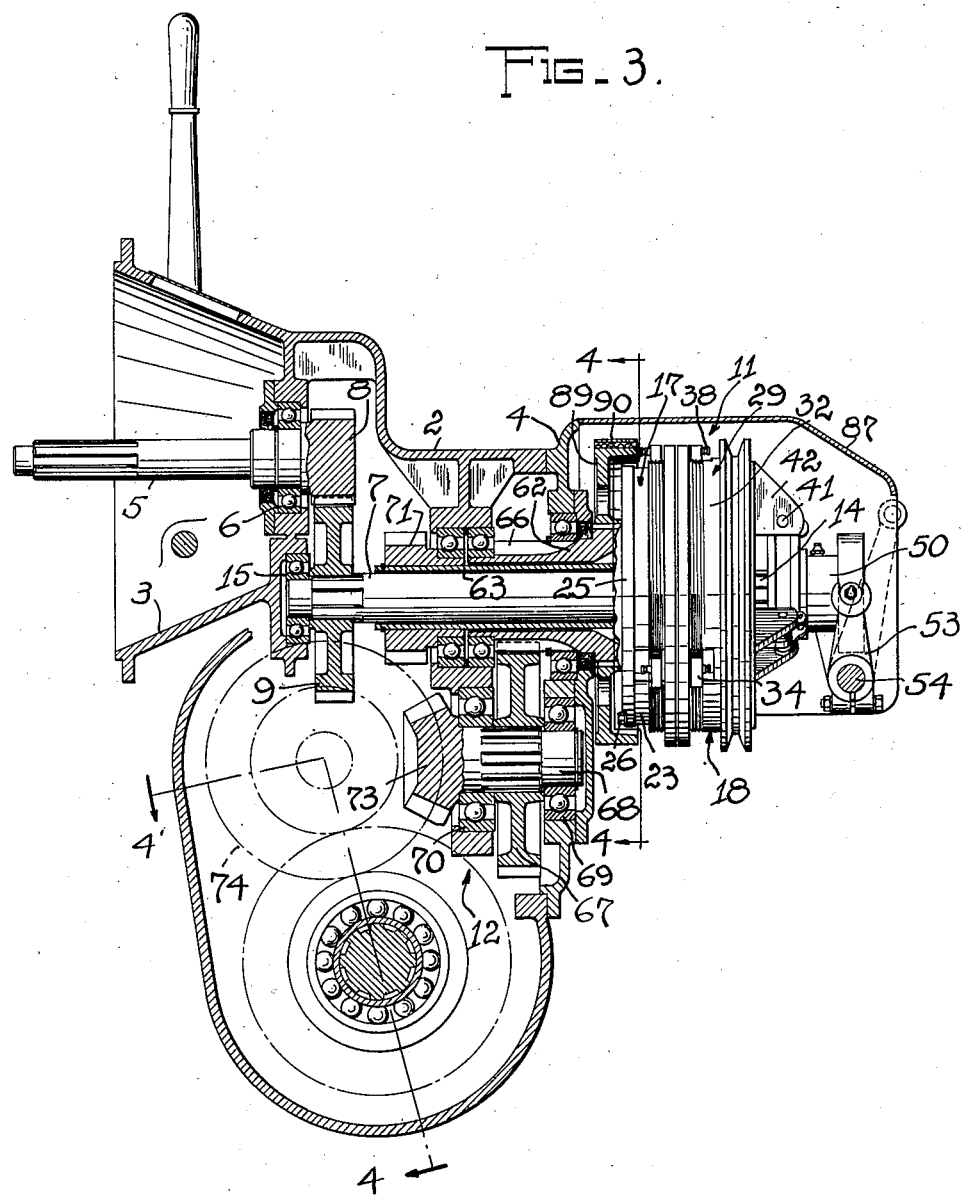
Fig. 3 is a transversal sectional view partly in elevation through the transmission, the section being taken on line 3—3 of Fig. 4.
Figure 4:
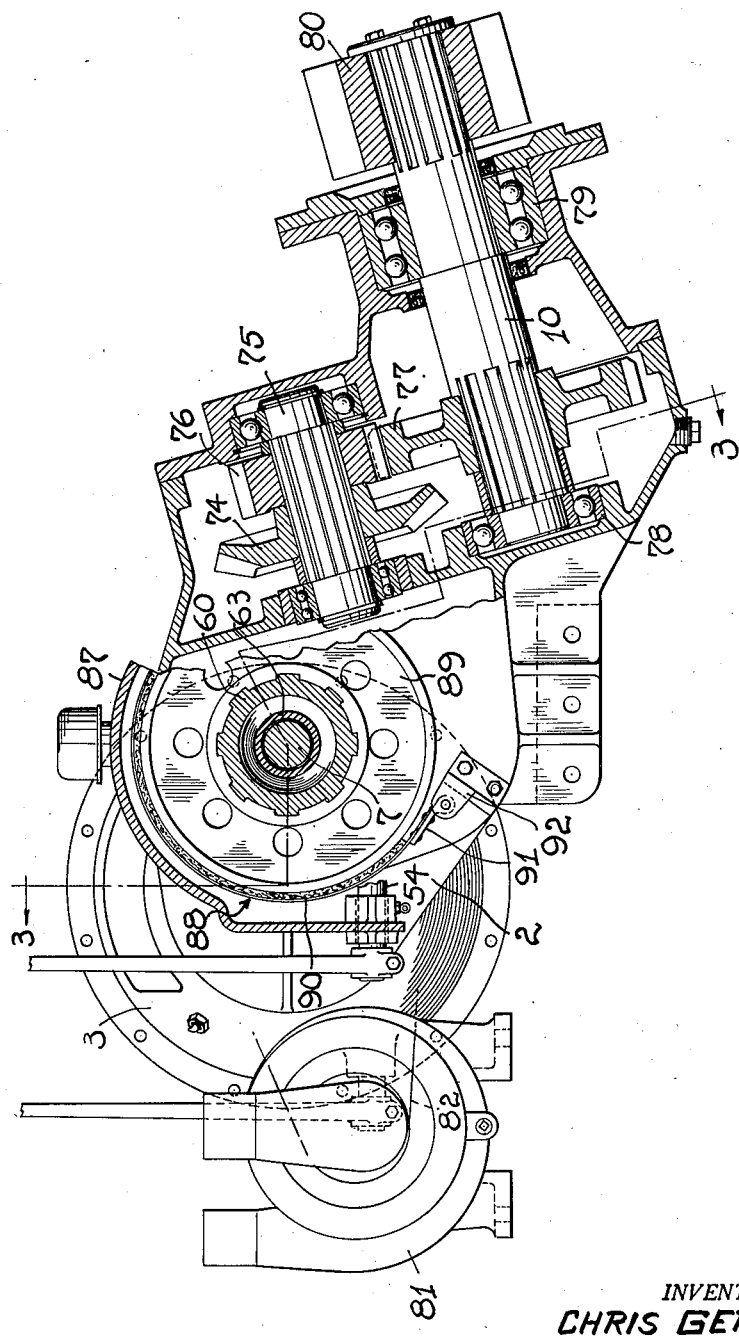
Fig. 4 is a cross sectional view through the transmission, the section being taken on lines 4—4 and 4'—4' of Fig. 3.

Referring now more particularly to the exemplified form of the transmission and clutch structure shown in the drawings, reference numeral 2 denotes a main housing which includes at its rear end a bell housing 3 and is closed at its front end by a cover member 4, preferably of a shape as indicated. Housing 2 has extended thereinto an input shaft 5 mounted in ball bearings 6, which input shaft is coupled with a countershaft 7 by means of gears 8 and 9 and in turn is coupled with an output shaft 10 by a dual clutch structure 11 and gearing 12. The output shaft 10 is extended laterally from housing 2 in an upwardly inclined plane for engagement with a rotary device to be driven (not shown), rotating about an inclined axis parallel to the axis of the output shaft.

Dual clutch structure 11, a dual friction clutch unit of the type disclosed in my copending applications—Serial No. 728,842 filed February 15, 1947 and Serial No. 784,681 filed November 7, 1947—includes a pressure plate structure with axially spaced pressure plates, and a backing plate structure positioned between the pressure plates for cooperation of the pressure plate structure with the backing plate structure in selectively actuating clutch disk assemblies of the dual friction clutch unit by shifting the pressure plate structure in opposite directions. This clutch structure is mounted on a splined end portion 14 of countershaft 7 journaled in housing 2 by a roller bearing 15 and the splined end portion 14 is extended outwardly through an opening 16 in cover member 4.

Dual friction clutch structure 11 embodies a pressure plate structure 17 and a backing plate structure 18 slidably and non-rotatably coupled with each other for joint rotation by countershaft 7. The pressure plate and backing plate structures are non-rotatably and axially shiftably interengaged with each other for selective coupling of countershaft 7 with gearing 12 by either one of two individual clutch disk assemblies 19 and 20 arranged within the pressure plate structure at opposite sides of backing plate means 21 of the backing plate structure.

Pressure plate structure 17 includes a cylindrical body member 22 having a peripheral wall 23 which is slotted parallel to the axis of body member 22 to provide same with radial slots 24. The body member has one end partly closed by a ring-shaped end plate 25 which is secured to the body member by bolts 26 and has the other end flanged inwardly to provide a flanged portion 27 arranged opposite to ring-shaped end plate 25. In addition body member 22 includes ear portions 28 which are integrally extended from the outside face of the flanged portion 27.

Backing plate structure 18 includes a cup-shaped body 29 mounting backing plates 30 and 31 so as to be positioned between ring-shaped end plate 25 and flanged portion 27 of the pressure plate structure. Body 29 has its peripheral wall 32 slidably and non-rotatably engaged with the outer face of the peripheral wall of cylindrical body member 22 and includes in the peripheral wall 32 slots 33 for radial driving lugs 34 extended from backing plates 30 and 31, which lugs also extend through the radial slots 24 in body member 22. The body 29 is dimensioned to be sleeved upon body member 22 and has integrally extended from its end wall 35 an internally splined hub member 36 mounting the cup-shaped body 29 on the splined end portion 14 of countershaft 7. The peripheral wall 32 of body 29 is externally threaded and in addition, radially slotted to provide this wall with the radial slots 24 in body member 22. The backing plates are held in adjusted position by ring members 37 which are threadedly engaged with the threaded peripheral wall 32 and held against rotation by spring-pressed plungers 38 mounted on the backing plates and fitting bores 39 in the side walls of the ring members 37.

Pressure plate structure 17 is shifted in opposite directions by dual clutch levers 40 to actuate either one of the two clutch disk assemblies 19 and 20. These dual clutch levers are pivotally mounted on shafts 41 between spaced ear portions 42 integrally extended from the body 29 of the backing plate structure adjacent to elongated openings 43 in the end wall 35 of body 29. The dual clutch levers which each include a third lever arm 44 linked by a link member 45 to the respective ear portion 28 on body member 22, which link member extends through the respective elongated opening 43, carry on their arms 46 and 47 rollers 48 and 49 and are actuated by a shifting member 50 coupled by a ball bearing 51 with a throw out collar 52 actuated by a fork member 53 mounted on a shaft 54. The shifting member 50 is slidably mounted on the splined end portion 14 of countershaft 7 and when shifted toward the dual clutch structure engages the inclined surfaces 55 of its extended jaw members 56 with the rollers 48 of the dual clutch levers 40 and effects tilting of these levers and therewith shifting of the pressure plate structure toward the right until clutch disk assembly 19 is tightly gripped between the ring-shaped end plate 25 and backing plate 30. Shifting of member 50 in the opposite direction, away from the dual clutch structure effects engagement of rollers 49 of dual clutch levers 40 with the oppositely inclined surfaces 57 of jaw members 56 and therewith tilting of the levers and shifting of the pressure plate structure toward the left until the clutch disk assembly 20 is tightly gripped between the flanged portion 27 and backing plate 31.

The thus constructed and actuated friction clutch structure which is mounted on the splined end portion 14 of countershaft 7 has its clutch disk assemblies 19 and 20 built up from friction driving disks 58, 58' non-rotatably and axially shiftably engaged with the toothed peripheral wall 23 of body member 22 and friction driven disks 59, 59' non-rotatably and axially shiftably engaged with the enlarged splined end portions 60 and 61 of two axially aligned intersleeved tubular shafts 62 and 63, respectively. Tubular shaft 63, which has its enlarged, splined end portion 61 freely, rotatably mounted by means of a ball bearing 64 on the hub member 36 of cup-shaped body 29, slidably and non-rotatably supports the friction driven disks 59' and tubular shaft 62, which has its enlarged, splined end portion 60 freely rotatably mounted by means of a ball bearing 65 on the tubular shaft 63, slidably and non-rotatably supports the friction driven disks 59. Tubular shafts 62 and 63 and countershaft 7 are axially aligned with each other, tubular shaft 63 being dimensioned to be freely sleeved upon countershaft 7 and tubular shaft 62 being dimensioned to be freely sleeved upon tubular shaft 63. The tubular shaft 62 is the forward drive shaft and meshes with its gear portion 66 a large gear 67 on a second countershaft 68 mounted in ball bearings 69 and 70; and tubular shaft 63, the reverse drive shaft, includes a pinion 71 which by means of a double idler gear 72 is coupled with the large gear 67 on countershaft 68. This latter countershaft includes at its inner end a bevel pinion 73 meshing a bevel gear 74 on a shaft 75, which mounts a small spur gear 76, meshing a large spur gear 77 on upwardly inclined output shaft 10, the latter being journaled in bearings 78, 79 and mounting at its exposed end a spur gear 80 adapted to be engaged with a coordinated gear on the device to be rotated (not shown).

In the operation of the transmission, when input shaft 5 is rotated by a power unit, rotation of the input shaft is transferred by gears 8 and 9 to countershaft 7 mounting the cup-shaped body 29 of the backing plate structure, and this body is continuously rotated with countershaft 7. Rotation of body 29 affords a driving means for a centrifugal pump structure 81 coupled with body 29 by a belt drive 82, including a belt 83, and driving and driven pulleys or pulley-like structures 84, 85 on body 29 and pump structure 81, respectively. Coupling of pulleys 84 and 85 is facilitated by a slot 86 in the hood-shaped cover member 87 which protects the dual friction clutch structure 11.

Actuation of the dual friction clutch structure effects coupling of countershaft 7 by clutch disk assemblies 19 and 20 with either tubular shaft 62, the forward drive shaft, or tubular shaft 63, the reverse drive shaft, and therewith rotation of the output shaft 10, either through gear 67, bevel pinion 73, bevel gear 74 and spur gears 76 and 77, or through pinion 71, double idler gear 72, gear 67, bevel pinion 73, bevel gear 74 and spur gears 76 and 77. As countershaft 7 is rotated in one direction only, each one of the tubular shafts 62 or 63 when coupled with the countershaft by its respective clutch disk assembly is rotated in the direction of rotation of such countershaft, and the tubular shaft, then not coupled with the countershaft is rotated in the opposite direction of rotation. Shifting of the transmission into reverse automatically effects change of rotation of the tubular shafts. A quick reversal of the transmission is facilitated by a brake arrangement 88 automatically actuated whenever the transmission is shifted to or through neutral position.

The brake arrangement 88 includes a brake drum 89, which is mounted on tubular shaft 62, and a brake band 90 partly encircling brake drum 89. Brake band 90 has its one end portion secured to housing 2 by a bracket 91 pivotally attached to a bracket member 92 on said housing and its other end portion adjustably secured to the short arm 93 of a dual lever member 94 by means of a bracket 95. This dual lever member is pivoted on shaft 96 and includes a longer lever arm 97 cooperating with a lever 98 on shaft 54.

Thus lever arm 97, yieldingly drawn toward lever 98 by a tension spring 99, has extended from its bottom surface a cam member 100 including two inclined side portions 101 and 102 and a recessed middle portion 103, and lever 98 carries at its outer end a roller 104 adapted to ride on cam member 100 when the shaft 54 is oscillated by actuation of the operating lever 105 also secured to shaft 54. Cam member 100 and lever 98 are so arranged with respect to each other that in neutral position of the clutch structure, roller 104 rests in the recessed middle portion 103 and in forward or reverse position of the clutch structure, engages the lower portions of the inclined side portions 101 and 102 of such cam member to permit tilting of dual lever member 94 by tension spring 99 and therewith automatic release of the friction action of brake band 90 on brake drum 89.

In describing the operation of the transmission it will be assumed that, as shown in Fig. 5, dual friction clutch structure 11 is in neutral position in which pressure plate structure 17 is inactive, the brake arrangement 88 is activated and all parts of the dual friction clutch structure, except tubular shafts 62, 63 and friction driven disks 59, 59' of clutch disk assemblies 19 and 20 are rotating with countershaft 7. If it is desired to drive output shaft 10 in a forward direction the operating lever 105 is shifted to the right to effect release of brake arrangement 88, and activation of clutch disk assembly 19 by shifting pressure plate structure 17 to the right. Such shifting effects rotation of tubular shaft 62 in a forward direction and this rotation of the tubular shaft through gear portion 66, gear 67, bevel pinion 73, bevel gear 74 and spur gears 76 and 77, effects forward rotation of output shaft 10. A reverse drive of output shaft 10 is effected by shifting the operating lever 105 to the left to effect first, activation of brake arrangement 88 and, thereafter, release of the brake arrangement and activation of clutch disk assembly 20 by shifting pressure plate structure 17 to the left. Such shifting effects coupling of tubular shaft 63 with countershaft 7 which tubular shaft through pinion 71, double idler gear 72, gear 67, bevel pinion 73, bevel gear 74 and spur gears 76 and 77, effects reverse rotation of output shaft 10.

Having thus described my invention, what I claim is:

1. In a transmission with a housing, and input and output shafts, coupled with each other by reversible gearing, a countershaft extended through said housing and geared to said input shaft for rotation thereby, a dual clutch structure arranged outwardly of said housing having driving members mounted on said countershaft, two tubular shafts arranged concentrically with respect to each other and said countershaft and mounting driven members of said dual clutch structure, gearing continuously coupling the tubular shafts with each other, and one of said tubular shafts with said output shaft, a brake means for one of said tubular shafts, and means for selectively engaging the driving members of the dual clutch structure with the driven members on either one of the tubular shafts and actuation of the brake means in neutral position of said engaging means.

2. A transmission as described in claim 1, wherein said brake means includes a brake drum mounted on the said one of said tubular shafts, a brake band for said brake drum and cooperating lever and cam means including an operating lever with a lever arm coupled with said brake band and a second lever arm yieldingly coupled with the said engaging means for cooperation therewith in braking and releasing operation of said brake means.

CHRIS GERST.

REFERENCES CITED

The following references are of record in the file of this patent:

UNITED STATES PATENTS

| Number | Name | Date |
| --- | --- | --- |
| 1,130,134 | Baldwin | Mar. 2, 1915 |
| 1,136,279 | Severy | Apr. 20, 1915 |
| 2,019,146 | Livermore | Oct. 29, 1935 |
| 2,138,618 | Seyerle | Nov. 29, 1938 |
| 2,335,926 | Fawick | Dec. 7, 1943 |
| 2,361,190 | Gerst | Oct. 24, 1944 |
| 2,443,313 | Gerst | June 15, 1948 |

FOREIGN PATENTS

| Number | Country | Date |
| --- | --- | --- |
| 142,575 | Germany | July 10, 1903 |
| 391,882 | Great Britain | May 4, 1933 |
| 715,462 | Germany | Dec. 22, 1941 |